UNITED STATES PATENT OFFICE.

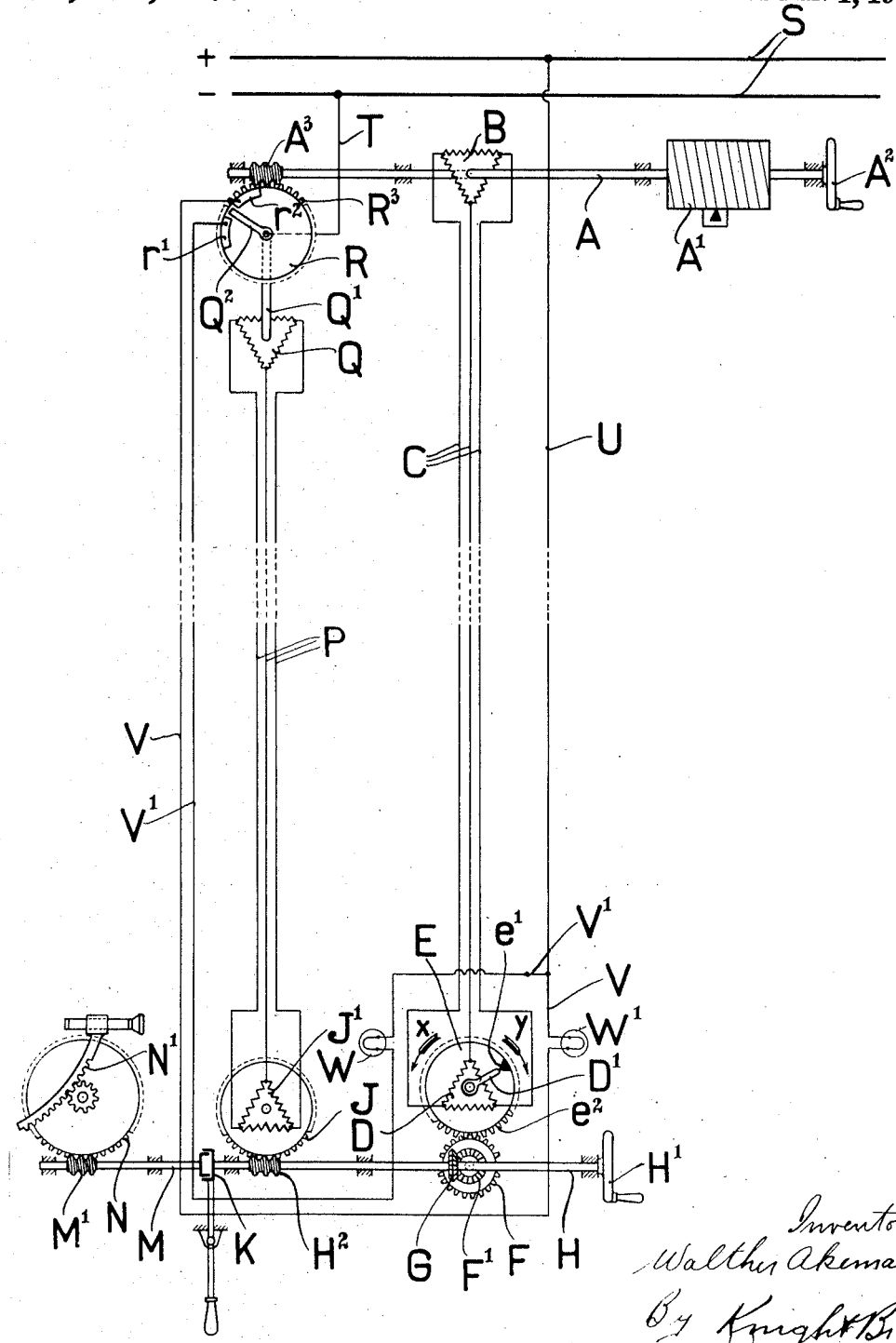

WALTHER AKEMANN, OF ESSEN, GERMANY, ASSIGNOR TO FRIED. KRUPP AKTIEN-GESELLSCHAFT, OF ESSEN-ON-THE-RUHR, GERMANY.

LONG-DISTANCE SIGNAL AND CONTROL APPARATUS.

1,370,257.      Specification of Letters Patent.      Patented Mar. 1, 1921.

Application filed September 3, 1920. Serial No. 408,079.

*To all whom it may concern:*

Be it known that I, Dr. WALTHER AKEMANN, residing at Essen, Germany, a citizen of the German Republic, have invented a certain new and useful Improvement in Long-Distance Signals and Control Apparatus, of which the following is a specification.

This invention relates to those arrangements for the indication at a distance of the position of pointers or the like with a synchronously acting transmitter and receiver in which a mark or coöperating pointer positively connected to the apparatus to be adjusted is provided at the receiving station. In a known arrangement of this kind such as shown in Patent No. 1,123,067, granted December 29th, 1914 to Barkhausen and Kaminsky several transmitters (coarse and fine transmitters) coupled to each other in a definite ratio of transmission and an equal number of receivers (coarse and fine receivers) electrically and mechanically independent of each other are employed for the purpose of obtaining as fine an adjustment as possible, coöperating pointers being situated opposite the pointers arranged on the receivers and positively connected to the apparatus to be adjusted and coupled to each other in the ratio of transmission of the transmitter. Such an arrangement has the disadvantage that several pointers and the coöperating pointers must be watched at the receiving station, which fact makes the manipulation of the apparatus difficult and prejudicially affects the clearness of arrangement of the apparatus, and which also suffers from the defect that when the transmission of orders begins, the apparatus to be adjusted, the coöperating pointers of which at first are not in agreement with the pointers of the receiver may be moved in the wrong direction, without the error being noticed immediately. For, owing to the ratio of transmission between the fine and coarse coöperating pointers being mostly large, the fine pointer may be moved for a considerable extent before the direction of the movement of the rough coöperating pointer can be detected. This circumstance means however loss of time and unreliability in action and therefore defects are attendant which must be absolutely avoided.

Now the object of the present invention is to provide an arrangement of the kind hereinbefore mentioned which does not possess the defects above mentioned, has only a single pointer and coöperating pointer at the receiving station and is therefore simpler to operate than the known arrangement and nevertheless permits of a very fine adjustment being obtained.

The invention will be described with reference to the accompanying drawing, which shows a diagrammatic view of the apparatus according to the present invention.

Upon a shaft A which serves for the driving of a transmitter B is keyed a drum $A^1$ which is provided with a range graduation and which can be rotated together with the transmitter B by means of a hand wheel $A^2$. The transmitter B is connected to the shaft after the manner of a fine transmitter that is to say it makes a large number of revolutions until the entire range of adjustment on the range graduation of the drum $A^1$ has been traversed. The rotation of the transmitter B is transmitted by conductors C to a receiver D in the usual way. The construction of the transmitter B and the receiver D is of such a nature, that both coöperate synchronously, so that, at any moment the angular path traversed by the armature of the receiver agrees with the angle through which the rotating part of the transmitter has been moved. The position of the receiver is read off by means of a pointer $D^1$ rigidly connected to the armature of the receiver and by means of a mark or coöperating pointer $e^1$, which latter is located on the periphery of a disk E adapted to rotate freely with respect to the pointer $D^1$. This disk E has a ring of teeth, which gear with the teeth of a spur wheel F which in its turn is rigidly connected to a bevel wheel $F^1$, which bevel wheel $F^1$ gears into a second bevel wheel G, which is keyed on a shaft H. This shaft H which is provided with a hand wheel $H^1$, is also connected by means of a worm wheel gearing $H^2$ J to the rotating part of an auxiliary transmitter $J^1$ and by a clutch K (which can be thrown out of action) with a coaxial shaft M, which in its turn is positively connected by a worm wheel gearing $M^1$ N to the sighting device $N^1$ of a gun, constituting the object to be adjusted. The range of adjustment of the sighting device $N^1$ corresponds to the range of adjustment of the drum A¹. The ratio of transmission of the toothed wheel gearing F e² is so designed that the disk E makes the same number of revolutions as the armature B of the transmitter, when the sighting device N¹ is moved its entire range of adjustment. The ratio of transmission of the gearing H² J is so designed that the entire range of adjustment of the sighting device N¹ corresponds to a single revolution of the auxiliary transmitter J¹.

This auxiliary transmitter J¹ is connected by conductors P with an auxiliary receiver Q coöperating synchronously with it and, the shaft Q¹ of which carries a contact arm Q². Coaxially with the receiver Q and the contact arm Q² is mounted a contact disk R, provided with two contacts r¹ and r² and adapted to rotate relatively to the shaft Q¹ and which contact disk R is driven by a worm wheel R³ and a worm A³ keyed on the shaft A which drives the transmitter. The ratio of transmission of the gearing A³ R³ is the same as that of the gearing H² J and is so proportioned that the entire range of adjustment of the drum A¹ corresponds to a single rotation of the contact disk R. The contact disk R together with the contacts r¹ and r² form a contact apparatus, which is intended to open or close a signaling circuit, according to the relative position of the contact arm Q² to the contacts r¹ and r². For this purpose the angular position of the contacts r¹ and r² (relatively to the center of the disk R) is so chosen, that, when the pointer Q² moves from the contact r¹ to the contact r², the pointer D¹ of the main receiver D makes nearly a complete revolution. Within this limit of nearly a complete revolution of the armature of the receiver the pointer D¹ can therefore move away from the mark e¹ before the contact apparatus Q² R comes into action.

From a source S of continuous current arranged at the transmitting station, a conductor T leads to the contact arm Q² and a second conductor U leads to the receiving station, where it branches into two conductors V and V¹. These conductors V and V¹ pass through signal lamps W and W¹ respectively back to the transmitting station, where they are connected to the contacts r¹ and r² of the contact disk R. At the receiver D D¹ are provided two arrows x and y, which indicate the two directions of rotation of the disk E and which are so arranged with respect to the signal lamps W and W¹, that, when these two lamps are lighted up, they are illuminated and thus allow it to be ascertained, in which direction the disk E is to be rotated when adjusting the sighting device N¹.

It will now be assumed, that the several parts of the apparatus described are in the position, in which they are shown in the drawing, that is to say at the receiver the mark or coöperating pointer e¹ is opposite the pointer D¹ and at the transmitter the contact arm Q² is in its middle position between the two contacts r¹ and r². It is also assumed that in this position of the said parts the sighting device N¹ occupies a position, which corresponds to the adjustment of the range drum A¹.

If now an adjustment of the sighting device N¹ which is positively connected to the worm wheel M¹ is to take place, the transmitter B is first rotated by means of the hand wheel A² until the amount to be adjusted, is conveyed to the mark of the drum A¹ bearing the range graduation. As it runs synchronously with the transmitter B, the receiver D is rotated through an angle of equal magnitude. The disk R of the contact apparatus Q² R which is positively connected to the shaft A also takes part in rotation thereof. As soon as the transmitter B has made nearly half a revolution, contact is established between the pointer Q² and one of the contacts r¹ or r² and the signaling circuit T V U or T V¹ U is consequently closed. Thus for example if the pointer Q² touches the contact r¹, the current passes through the conductor V¹, so that the signal lamp W lights up at the receiving station. By the lighting up of the lamp W by which the arrow x is illuminated, the man, who works the apparatus to be adjusted, at once knows, that he must turn the hand wheel in such a direction that the mark e¹ moves in the direction of the arrow x. As soon as the hand wheel H¹ is turned in the corresponding direction, the sighting device also begins to move. During this operation the disk E also rotates in the direction of the arrow x and at the same time the armature of the auxiliary transmitter begins to revolve. A corresponding rotation is also imparted to the armature of the auxiliary receiver Q, which is connected to the auxiliary transmitter J¹ by the conductors P and the contact pointer Q² rigidly connected thereto and the contact pointer Q² moves at the same time in the direction, in which the disk R moves during the rotation of the hand wheel A².

As soon as the pointer Q² leaves the contact r¹ during this rotation of the contact pointer Q² and the disk R in the same direction, the signal lamp W goes out. Owing to the extinction of this lamp, the man who works the apparatus to be adjusted, knows, that the rough adjustment of the sighting device is obtained and he need only turn the hand wheel H¹ now to such an extent in the given direction, until the mark e¹ has coincided with the pointer D¹ within a single revolution. As soon as the mark e¹ registers with the pointer D¹, the sighting device has received the adjustment, which corresponds exactly to the adjustment of the drum $A^1$.

If the rotation of the hand wheel $H^1$ were to be continued in the given direction, the pointer $Q^2$ would remain stationary between the contacts $r^1$ and $r^2$ but would after a short time come in contact with the contact $r^2$ which would cause current to be supplied to the conductor V and the signal lamp $W^1$ would accordingly light up and illuminate the arrow $y$. This would mean however that the mark $e^1$ would now have to be turned by means of the hand wheel H in the direction of the arrow $y$, that is to say clockwise, until the extinction of the lamp $W^1$ again indicated the termination of the rough adjustment of the worm wheel N and the sighting device $N^1$. To effect the fine adjustment, the rotation would then have to be continued in the direction of the arrow $y$, until the mark $e^1$ is again brought into coincidence with the pointer $D^1$.

In the manner described it is not only possible to adjust the apparatus to be adjusted by a definite amount to which the transmitter is adjusted, but the part to be adjusted can also be so moved by means of the arrangement so that its position constantly agrees with the position of the continuously moved transmitter B. In general it is at the same time possible to rotate the mark $e^1$ conjointly with the pointer $D^1$ with such accuracy that they remain constantly, or at least approximately so, in coincidence with each other so that after at the beginning of the adjusting operation the rough concordance between the transmitter B and the part $N^1$ to be adjusted has once been obtained by the aid of the signal lamps W or $W^1$ no illumination of the signal lamps W and $W^1$ takes place. If, however, there should occur at any time a divergence between the pointer $D^1$ and the mark $e^1$, which should be greater than one revolution of the pointer $D^1$, the lamp corresponding to that arrow lights up, in the direction of which the mark $e^1$ has to be moved back, until the lamp goes out again.

Since, when the rough adjustment of the object to be adjusted is correctly made, the contact arm $Q^2$ must always be situated between the two contacts $r^1$ and $r^2$, it is possible at once, to observe at the transmitting station whether the coarse adjustment is complete or not.

Instead of signaling lamps other signaling devices such as drop shutters may of course also be employed.

Claims:

1. An apparatus of the class described, comprising a transmitter, a shaft for rotating said transmitter, a receiver operated by and synchronously with said transmitter, a pointer operatable by said receiver, a coöperating pointer, an object to be adjusted, means for adjusting said object, the coöperating pointer being operated by said object-adjusting means, a contact apparatus, a circuit including said contact apparatus, a signal device in said circuit, and an auxiliary transmitter operatable by the object-adjusting means, the auxiliary transmitter being connected to the object-adjusting means so that it rotates once during the entire range of adjustment of the object, said coöperating pointer rotating a number of times during the entire range of adjustment of the object, said contact apparatus being controlled jointly by the transmitter shaft and the auxiliary transmitter.

2. An apparatus of the class described, comprising a transmitter, a transmitter shaft, a receiver operatable by and synchronously with said transmitter, a pointer rotated by said receiver, a coöperating pointer, an object to be adjusted, means for adjusting said object, the coöperating pointer being operated by said object adjusting means, an auxiliary transmitter operated by said object-adjusting means, said auxiliary transmitter rotating once during the entire range of adjustment of the object, said coöperating pointer rotating a number of times during the adjustment of the object, two signaling lamps, a circuit for each lamp, and a contact device for controlling said circuits, one part of said contact device being operatable by said auxiliary transmitter and the other part of said contact device being operatable by the transmitter shaft.

The foregoing specification signed at Essen, Germany, this 27th day of May, 1920.

Dr. WALTHER AKEMANN.

In presence of —
    Hans Gottsmann,
    Josef Olbertz.